C. M. FARRER.
CULINARY IMPLEMENT.
APPLICATION FILED FEB. 23, 1916.
1,238,656.
Patented Aug. 28, 1917.
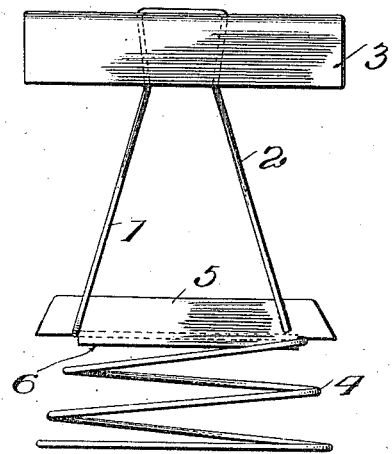
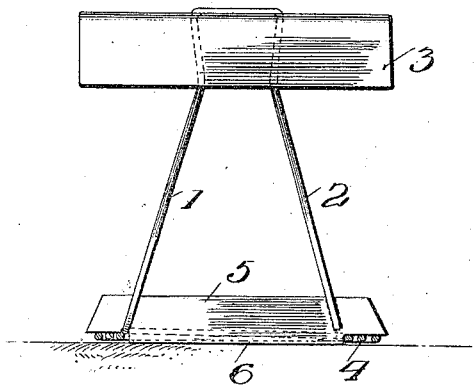
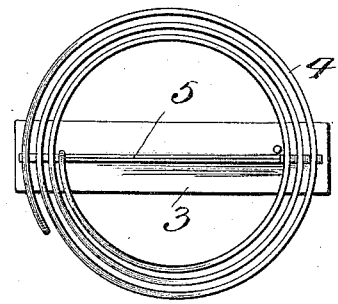
Witness
W. A. Williams.
Mildred P. Imrie.
Inventor
Charles M. Farrer.
By
His Attorneys

UNITED STATES PATENT OFFICE.

CHARLES M. FARRER, OF SEATTLE, WASHINGTON.

CULINARY IMPLEMENT.

1,238,656.　　　　　Specification of Letters Patent.　　Patented Aug. 28, 1917.

Application filed February 23, 1916.　Serial No. 80,038.

*To all whom it may concern:*

Be it known that I, CHARLES M. FARRER, of Seattle, in the county of King and State of Washington, have invented certain new and useful Improvements in Culinary Implements; and I do hereby declare the following to be a full, clear, and exact description of the invention, such as will enable others skilled in the art to which it appertains to make and use the same.

My invention relates to culinary implements, and the object of the invention is to provide an improved, simple and efficient device for cutting and mixing the ingredients of pastry or other dough.

In the accompanying drawing, Figure 1 is a view in side elevation showing the device in one position. Fig. 2 is a similar view showing the implement compressed. Fig. 3 is a bottom plan view.

Referring to the drawing, 1 designates a continuous length of spring steel wire bent in an upwardly direction and then back upon itself to form a support 2 for a handle 3, the wire being passed through or otherwise rigidly secured to the handle. Beginning at the lower end of the support the wire is bent to form a series of spirally arranged convolutions 4, the lower extreme end of the wire being loose.

Arranged transversely of the coils and secured to the lower portion of the support 2 is a knife or blade 5. This blade, which may be soldered to the wire or secured in any preferred manner, is cut away at its ends adjacent its connection with the support to provide a central portion 6 which is designed to freely pass between the convolutions 4 as the device is reciprocated up and down.

As is readily apparent, the operator combines the ingredients in a mixing bowl by a simple up and down and horizontal movement of the implement. This movement effects, through the instrumentality of the coils and the knife, a thorough mixing and cutting of the shortening and flour. The downward movement will cause a scissor-like cutting or shearing of the ingredients between the various coils and a cutting action by the knife, while the upward movement of the parts gives a further shearing action.

The absence of joints renders the device sanitary and enables it to be readily cleansed. By its use the necessity of having the hands in contact with the mixture is obviated.

I claim as my invention:

As an article of manufacture, a mixing implement comprising a continuous length of spring wire bent to form a handle support and a series of convolutions designed to be compressed one within the other, and a cutting member arranged transversely of said convolutions, said cutting member having a portion of less length than the diameter of the smallest convolution.

In testimony whereof, I have signed this specification in the presence of two subscribing witnesses.

CHARLES M. FARRER.

Witnesses:
P. M. FARRER,
H. R. AUDLEY.

Copies of this patent may be obtained for five cents each, by addressing the "Commissioner of Patents, Washington, D. C."